United States Patent [19]

Roth et al.

[11] Patent Number: 5,703,590
[45] Date of Patent: Dec. 30, 1997

[54] DETECTING ACTIVE EMITTERS USING SCAN RATE CORRELATION OF TRACKING RECEIVER AND RADAR DATA

[75] Inventors: Steve Roth, Fullerton; Thomas A. Kennedy, Manhattan Beach, both of Calif.

[73] Assignee: Hughes Electronics, Los Angeles, Calif.

[21] Appl. No.: 656,159

[22] Filed: May 31, 1996

[51] Int. Cl.$^6$ .................................................. G01S 3/22
[52] U.S. Cl. .................................. 342/13; 342/146
[58] Field of Search ........................... 342/95, 13, 20, 342/146, 147, 154, 371

[56] References Cited

U.S. PATENT DOCUMENTS 5,469,165  11/1995  Milroy ....................... 342/13

Primary Examiner—Daniel T. Pihulic
Attorney, Agent, or Firm—Leonard A. Alkov; Wanda K. Denson-Low

[57] ABSTRACT

A method wherein the scan rate of an active emitter is simultaneously estimated by a tracking receiver and a radar system and are then compared to correlate tracks generated by the tracking receiver and the radar system. The output produced by the present method provides for data that is more accurately indicative of the locations and identifications of emitters tracked by the tracking receiver and the radar system. More specifically, the method comprises the following steps. An active emitter having a scanning antenna is simultaneously tracked using a tracking receiver and a radar system. The location of the emitter is estimated using the tracking receiver by processing measurements of the electromagnetic signals generated by the emitter. The scan rate of the emitter is estimated using the tracking receiver by detecting strobing of the main lobe of the signals generated the emitter. The scan rate of the emitter is estimated using the radar system. Finally, the respective estimated scan rates are correlated to improve the accuracy of the estimated location and identification of the emitter.

6 Claims, 1 Drawing Sheet

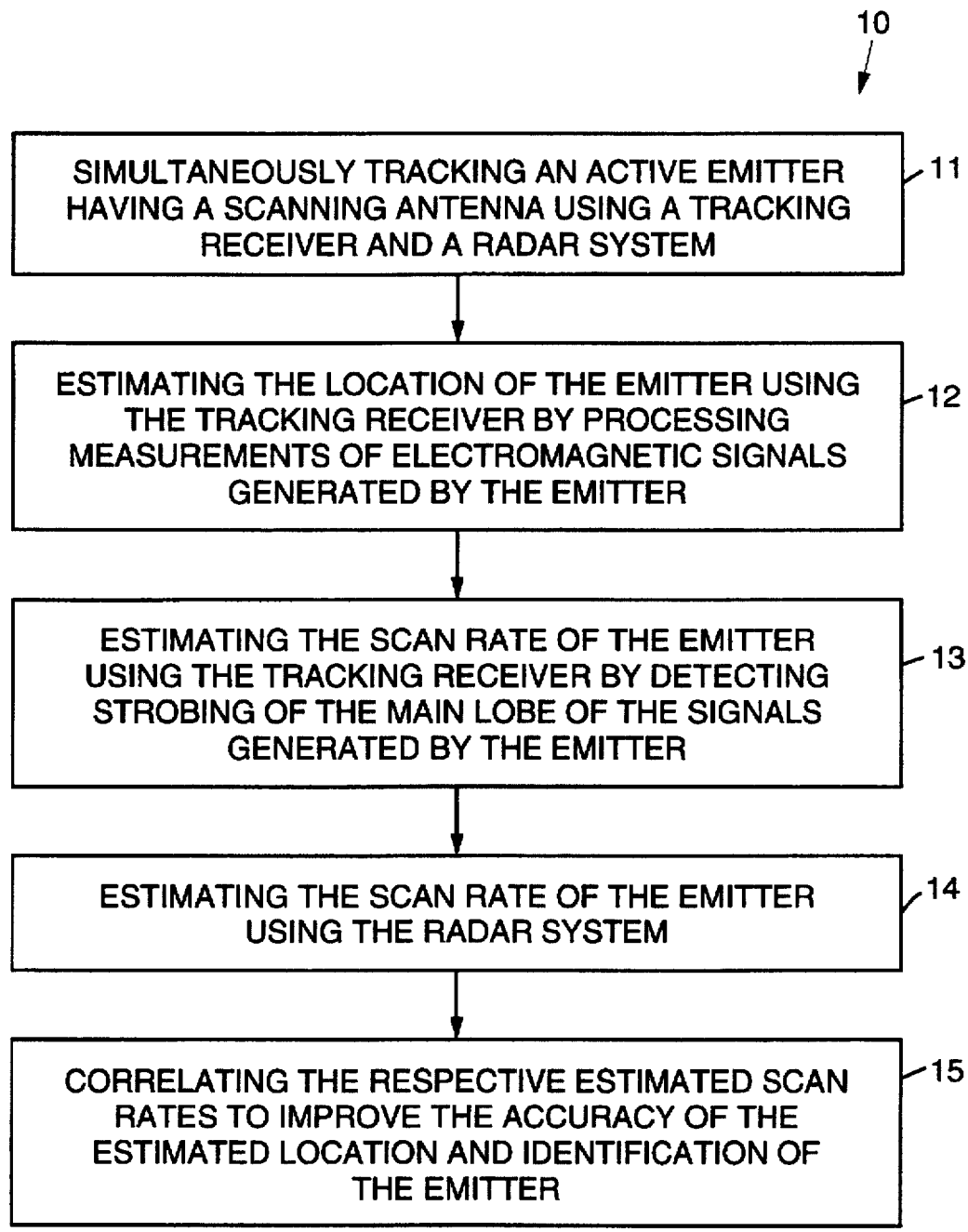

DETECTING ACTIVE EMITTERS USING SCAN RATE CORRELATION OF TRACKING RECEIVER AND RADAR DATA

BACKGROUND

The present invention relates generally to systems and methods for locating active emitters, and more particularly, to a method of detecting active emitters using scan rate correlation of data derived from a tracking receiver and a radar system.

Heretofore, tracking receivers have processed scan rate measurements derived from active emitters as an adjunct to determine the location and identification of the emitters. Radars are also capable of measuring the scan rate of detected emitters by evaluating induced Doppler shifts of mechanically scanned antennas of the emitters, or reflected sisal modulation of electronically scanned antennas of the emitters.

Conventionally, when tracks generated by radars and tracking receivers are correlated, it is done based solely on bearing association. While the radar generally provides an accurate position, typically better than one degree, the tracking receiver is often much less precise, typically having an accuracy of about ten degrees with little or no range estimation, although it is possible to achieve one degree accuracy. The problem is that in many situations, a multiplicity of tracks are oriented in the same general direction. Consequently, the association of one or more tracking receiver tracks with multiple radar tracks becomes unreliable in all but the simplest scenarios.

Accordingly, it is an objective of the present invention to provide for an improved method of detecting active emitters using scan rate correlation of data derived from a tracking receiver and a radar system.

SUMMARY OF THE INVENTION

To meet the above and other objectives, the present invention provides for a method wherein scan rates measured by both a tracking receiver and a radar system are compared to correlate tracks generated by the tracking receiver and the radar system. The output produced by the method provides for data that is more accurately indicative of the locations and identifications of emitters tracked by the tracking receiver and the radar system.

The present method processes data derived from a tracking receiver and a radar system that are indicative of the location of an active emitter. The present method improves the accuracy of the location estimates produced by both the tracking receiver and can improve the identification of tracks in both the tracking receiver and the radar system. The method comprises the following steps. An active emitter having an antenna is simultaneously tracked using a tracking receiver and a radar system. The location of the emitter is estimated using the tracking receiver by standard processing measurements of amplitude, phase or time-of-arrival differences or the rate of change of phase of signals generated by the emitter. The scan rate of the emitter is estimated using the tracking receiver by detecting strobing of the main lobe of the signals generated by the emitter. The scan rate of the emitter is estimated using the radar system. Finally, the respective estimated scan rates are correlated to improve the accuracy of the estimated location and identification of the emitter.

The tracking receiver and the radar system use different measured parameters to identify and produce their respective tracks. Using the present method, these respective measurements are processed to effectively complement one another to improved overall performance in accurately determining the locations of the emitters.

In the present invention, data is shared between the tracking receiver and the radar system to generate more accurate emitter location and identification. The tracking receiver is generally more capable of identifying tracks using measurements of emitted frequency, pulse repetition interval, pulse width and scan rate. These measurements are compared to corresponding data ranges stored in a database. The radar system is more capable of locating and measuring kinematics of tracks (including three-dimensional position, and velocity vectors). Because of the differences in the types of track data, it has heretofore been difficult to correlate tracks between the tracking receiver and the radar system. The present invention significantly improves the accuracy of the correlation of the tracks produced by the radar system and tracking receiver.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which the sole drawing FIGURE illustrates a method in accordance with the principles of the present invention of detecting active emitters using scan rate correlation of data derived from a tracking receiver and a radar system.

DETAILED DESCRIPTION

Referring to the drawing FIGURE, it illustrates an embodiment of a method 10 in accordance with the principles of the present invention. The method 10 is used to more accurately determine the location and identification of active emitters by correlating scan rate data derived from a tracking receiver and a radar system. The present method 10 is typically employed as part of a processor on board an aircraft that is employed to process data generated by the tracking receiver and radar system.

The present method 10 processes scan rate data associated with an emitter using both the radar system and tracking receiver and correlates tracks produced thereby to improve the accuracy of emitter locations and identifications determined by both systems. The tracking receiver is used to measure the scan rate of signals derived from the emitter. As the emitter scans, its antenna pattern variations are detected by the tracking receiver as changes in the received amplitude of the signal produced by the emitter and received by the tracking receiver.

The radar is also used to determine the scan rate of the emitter. For an emitter that uses a mechanically scanned antenna, a Doppler shift induced by movement of the antenna is processed by the radar system to estimate the scan rate of the emitter. For an emitter that uses an electronically scanned antenna, modulation induced on the radar return due to mode scattering within the antenna of the emitter is used to determine the scan rate of the emitter. The method 10 then employs the scan rate estimates produced by the radar system and tracking receiver to produce a more accurate correlation of the tracks.

With specific reference to the drawing figure, in the present method 10, an active emitter, such as a radar comprising a mechanically scanned antenna or an electronically scanned antenna, for example, is simultaneously tracked 11 using a tracking receiver and a radar system. The location of the emitter is estimated 12 using the tracking receiver by processing 12 measurements of the received electromagnetic signal from the emitter. The scan rate of the emitter is estimated 13 using the tracking receiver by detecting 13 strobing of the main lobe of the received signal from the active emitter as the antenna scans.

The radar system processes 14 radar returns from the active emitter and estimates 14 the scan rate of the emitter. In the case of emitters that use a mechanically scanned antenna, the Doppler shift induced by the movement of the antenna of the emitter is processed 14 to generate the scan rate data. For emitters that use an electronically scanned antenna, the scan rate of the emitter is estimated using the radar system by processing 14 modulation induced on the radar return due to mode scattering within the antenna of the emitter. The respective estimated scan rates derived from the targeting receiver and radar system are then correlated 15 to improve the accuracy of the estimated location and identification of the emitter. The correlation processing 15 may be accomplished by many well-known processing techniques, such as those described in a book entitled "Detection Estimation and Modulation Theory", Volume 1, authored by VanTrees, for example.

The tracking receiver identifies tracks using measurements of emitted frequency, pulse repetition interval, pulse width and scan rate. These measurements are compared to corresponding parameter ranges stored in a database. The radar system locates and measures kinematics of tracks, including three-dimensional position, and velocity vectors. Data is shared between the tracking receiver and the radar system using the present method 10 to generate more accurate emitter location and identification information. The present method 10 thus significantly improves the accuracy of the correlation of the tracks produced by the radar system and the tracking receiver.

The correlation between tracks provided by the radar system and tracking receiver is thus primarily achieved by processing scan rate data generated by the two systems. However, the correlation between tracks may be further improved by comparing the phasing of the emissions produced by the emitter in real time. In particular, data derived from the radar system and tracking receiver that are indicative of when the emitter is pointed toward the radar system or tracking receiver, are correlated to resolve possible ambiguities if there are multiple emitters present with similar scan rates.

Thus, an improved method of detecting active emitters using scan rate correlation of data derived from a tracking receiver and a radar system has been disclosed. It is to be understood that the described embodiment is merely illustrative of some of the many specific embodiments which represent applications of the principles of the present invention. Clearly, numerous and varied other arrangements may be readily devised by those skilled in the art without departing from the scope of the invention.

What is claimed is:

1. A method of processing data derived from a tracking receiver and a radar system that are indicative of the location of an active emitter that improves the accuracy of the location, said method comprising the steps of:

simultaneously tracking an active emitter having a scanning antenna using a tracking receiver and a radar system;

estimating the location of the emitter using the tracking receiver by processing measurements of power or time differences of signals generated thereby;

estimating the scan rate of the emitter using the tracking receiver by detecting strobing of the main lobe of the signals generated thereby;

estimating the scan rate of the emitter using the radar system; and correlating the respective estimated scan rates to improve the accuracy of the estimated location of the emitter.

2. The method of claim 1 wherein the active emitter comprises a radar having a mechanically scanned antenna.

3. The method of claim 2 wherein the step of estimating the scan rate of the emitter using the radar system comprises the step of processing the Doppler shift induced by movement of the emitter.

4. The method of claim 1 wherein the emitter comprises a radar having an electronically scanned antenna.

5. The method of claim 4 wherein the step of estimating the scan rate of the emitter using the radar system comprises the step of processing modulation induced on the radar return due to the mode scattering within the antenna of the emitter.

6. The method of claim 1 further comprising the steps of:

detecting when the antenna of the emitter is pointed at the tracking receiver;

detecting when the antenna of the emitter is pointed at the radar system;

comparing the phasing between the two detections of the tracking receiver and radar system to differentiate between emitters with similar scan rates.

* * * * *